United States Patent [19]
Harris et al.

[11] Patent Number: 5,150,813
[45] Date of Patent: Sep. 29, 1992

[54] RECEPTACLE AND MOULD FOR MAKING THE SAME

[75] Inventors: Sydney J. Harris, Berkshire; Andrew C. Woolnough, London, both of England

[73] Assignee: Earley Marketing Limited, Aldermaston, England

[21] Appl. No.: 656,782

[22] Filed: Feb. 15, 1991

[30] Foreign Application Priority Data

Feb. 16, 1990 [GB] United Kingdom ............... 9003612

[51] Int. Cl.⁵ .................................................. B65B 5/52
[52] U.S. Cl. .............................. 220/480; 206/45.26; 206/491
[58] Field of Search ............ 220/476, 480; 206/44 R, 206/45.26, 491; 229/164, 117.18

[56] References Cited

U.S. PATENT DOCUMENTS

| | | | |
|---|---|---|---|
| 2,765,906 | 10/1956 | Rossum | 206/45.26 |
| 3,292,290 | 12/1966 | Potter | 206/491 X |
| 3,567,014 | 3/1971 | Feigelman | 206/44 R |
| 3,674,133 | 7/1972 | Locke | 206/44 R |
| 3,918,583 | 11/1975 | Adams | 206/491 |
| 4,197,939 | 4/1980 | Dogliotti | 206/44 R |
| 4,355,758 | 10/1982 | Lavery | 229/117.18 |
| 4,846,333 | 7/1989 | Kissick | 220/480 X |
| 5,029,702 | 7/1991 | Tong | 206/491 X |
| 5,083,663 | 1/1992 | Conway et al. | 206/45.26 |

FOREIGN PATENT DOCUMENTS 0198477 10/1986 European Pat. Off. .
2291724 6/1976 France .

Primary Examiner—Steven M. Pollard
Attorney, Agent, or Firm—Lorusso & Loud

[57] ABSTRACT

A receptacle is injection moulded of rigid plastics material being open at the top and comprising a bottom, front wall, spaced rear wall and two side walls connecting front and rear walls at either side of the receptable. The front wall, both side walls are connected to the bottom of the receptacle. An upper edge of the front wall is spaced from the bottom by a distance less than that by which a lower edge of the rear wall is spaced from the bottom. The rear wall is connected to the side walls only at positions spaced from the bottom a greater distance than uppermost edges of the front wall. The container can be made using a relatively cheap mould and with improved productivity: embossed portions can be provided on the front and rear walls.

7 Claims, 3 Drawing Sheets

RECEPTACLE AND MOULD FOR MAKING THE SAME

BACKGROUND OF THE INVENTION

This invention is concerned with a receptacle and mould for making the same and it is especially concerned with an injection moulded receptacle.

Receptacles injection moulded of a suitable rigid plastics material are commonly provided for holding and displaying a supply of leaflets, greeting cards or other literature. Such receptacles commonly have a bottom and are of generally rectangular cross-section having parallel front and rear walls and parallel side walls, perpendicular to the front and rear walls and connecting the front and rear walls together. Commonly means is provided at a rear wall by which the receptacle may be hung, for example from a hook on a wall or display rack. Although such receptacles have been made in the past by injection moulding, in order to provide a satisfactory moulding, it has been necessary to use extremely expensive injection moulds of the moving core type. Not only are such moulds extremely expensive but, because of the necessity of the core to move through a considerable distance in each moulding operation, the moulding cycle time has been relatively slow. Thus production costs, using the known constructions are relatively high, making the moulded receptacles fairly expensive. In addition, there has been no way of satisfactorily moulding onto the surface of the receptacle any promotional material, for example the name of the organization supplying the receptacles, instructions for use of the contents or any other material because the direction of movement of the moving core and other mould parts have been parallel with the surfaces on which such information would need to be moulded thus preventing such moulding other than by extremely complex and uneconomical techniques.

OBJECTS OF THE INVENTION

One of the various objects of the present invention is to provide an improved injection moulded receptacle.

Another of the objects of the present invention is to provide an improved mould suitable for use in moulding such a receptacle.

SUMMARY OF THE INVENTION

In one aspect the invention may be considered to provide an injection moulded receptacle which is open at the top comprising a bottom, a front wall, a rear wall spaced from the front wall and two side walls connecting the front and rear walls at either side of the receptacle, both side walls, or the front wall and both side walls, being connected to the bottom, an upper edge of the front wall being spaced from the bottom by less than the distance of a lower edge of the rear wall from the bottom, the rear wall being connected to the side walls only at positions spaced from the bottom a greater distance than the position at which the upper edge of the front wall is connected to the side wall.

In a preferred receptacle in accordance with the invention the front wall comprises two side regions each connected to an adjacent side wall and having an uppermost edge and a central region between the side regions having an upper edge spaced from the bottom by a distance less than the height of said uppermost edges and wherein the rear wall has side regions connected to the side walls above said uppermost edges and a central region corresponding with the central region of the front wall projecting downwardly below the side regions of the rear wall and spaced from the bottom by a distance substantially the same as the distance by which the upper edge of the central region of the front wall is spaced from the bottom.

Preferably the side walls are flat and parallel, and the front and rear walls are also flat, parallel and perpendicular to the side walls. Conveniently the front and rear walls are inclined rearwardly from the bottom upwards.

Preferably means, for example two keyhole slots are provided in an upper portion of the rear wall by which the receptacle may be attached to a support.

Preferably a receptacle in accordance with the invention comprises a connecting member, for example a hook, projecting outwardly from one of the side walls, and a correspondingly positioned opening in the opposite side wall, the construction and arrangement being such that the hook can be inserted into the opening of an adjacent similar receptacle thus to engage the adjacent receptacle and connect the two receptacles together.

A preferred receptacle in accordance with the invention comprises an embossed portion on the front and/or rear walls.

In another aspect the invention may be considered to provide an injection mould suitable for use in moulding a receptacle in accordance with the invention, the mould comprising two mould parts which meet at a parting line to define a closed mould cavity wherein a first mould part has moulding faces which provide parts of the mould cavity defining rear surfaces of the front and rear walls of the receptacle and inner surfaces of the side walls and bottom of the receptacle and the second mould part has moulding faces which provide parts of the mould cavity defining front surfaces of the front and rear walls.

Preferably a mould in accordance with the invention comprises moulding faces of the second mould part which define outer surfaces of the side walls and bottom of a receptacle moulded thereby.

In a preferred mould in accordance with the invention the mould cavity faces defining a portion of a hook connected to one of the side walls of a receptacle are perpendicular to the mould face defining the outer surface of the side wall and parallel with the mould faces defining the bottom of the receptacle and faces defining a hook end portion are parallel with the mould face defining the outer surface of the side wall and perpendicular to the mould faces defining the bottom of the receptacle.

A preferred mould in accordance with the invention comprises a removable insert in one or the mould parts adapted to provide an embossed portion on the front or rear wall of a receptacle moulded thereby.

There now follows a detailed description to be read with reference to the accompanying drawings of a receptacle embodying the invention and of a mould and method suitable for use in moulding such a receptacle, themselves embodying the invention in some of its aspects. It will be realised that the receptacle mould and method have been selected for description to illustrate the invention by way of example.

DETAILED DESCRIPTION OF THE PREFERRED EMBODIMENTS

Figure 1:
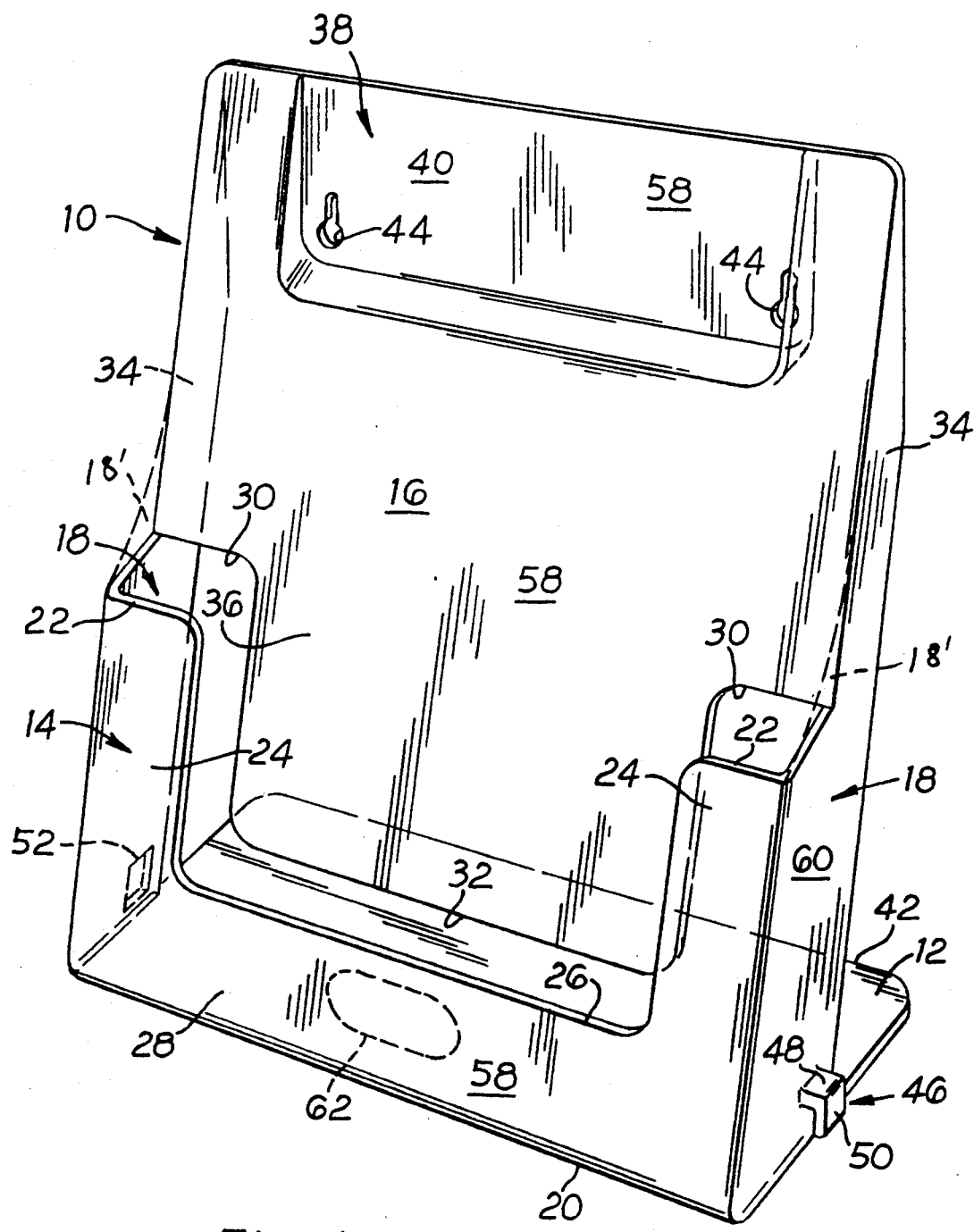
FIG. 1 is a front perspective view of a receptacle embodying the invention.

The illustrative receptacle 10 is open at the top and comprises a bottom 12 a front wall 14 a rear wall 16 spaced from the front wall and two side walls 18 connecting the front and rear walls 14, 16 at either side of the receptacle. Both side walls 18 and the front wall 14 are connected to the bottom 12, the front wall 14 being connected to the bottom along a front edge portion 20. An upper edge comprising uppermost edges 22 of side regions 24 of the front wall 14 and an upper edge 26 of a central region 28 of the front wall are spaced from the bottom 12 of the receptacle by less than the distance of a lower edge 30, 32 of the rear wall 16. The lower edges 30 are provided by side regions of the rear wall which are connected to portions 34 of the side walls 18 which extend rearwardly of the rear wall of the receptacle, above the uppermost edges 22 of the wall 14. A central region of the rear wall 16 provided by a tongue 36 projects downwardly below the side regions of the rear wall and has a lowermost edge 32 spaced from the bottom 12 of the receptacle by a distance substantially the same as, but slightly greater than, the distance by which the upper edge 26 of the central region 28 of the front wall 14 is spaced from the bottom 12.

As can be seen from the drawings, the bottom 12, side walls 18, front wall 14 and a substantial portion of the rear walls 16 are flat. A recess 38 is provided in an upper portion of the rear wall 16. As can be seen viewing FIG. 3 the front and rear walls are inclined rearwardly from the bottom 12 upwards. A rear edge 42 of the bottom 12 of the receptacle defines a straight line lying in the plane of a flat rear portion 40 of the recess 38. Two keyhole slots 44 are formed in the rear portion 40 of the recess.

Figure 3:
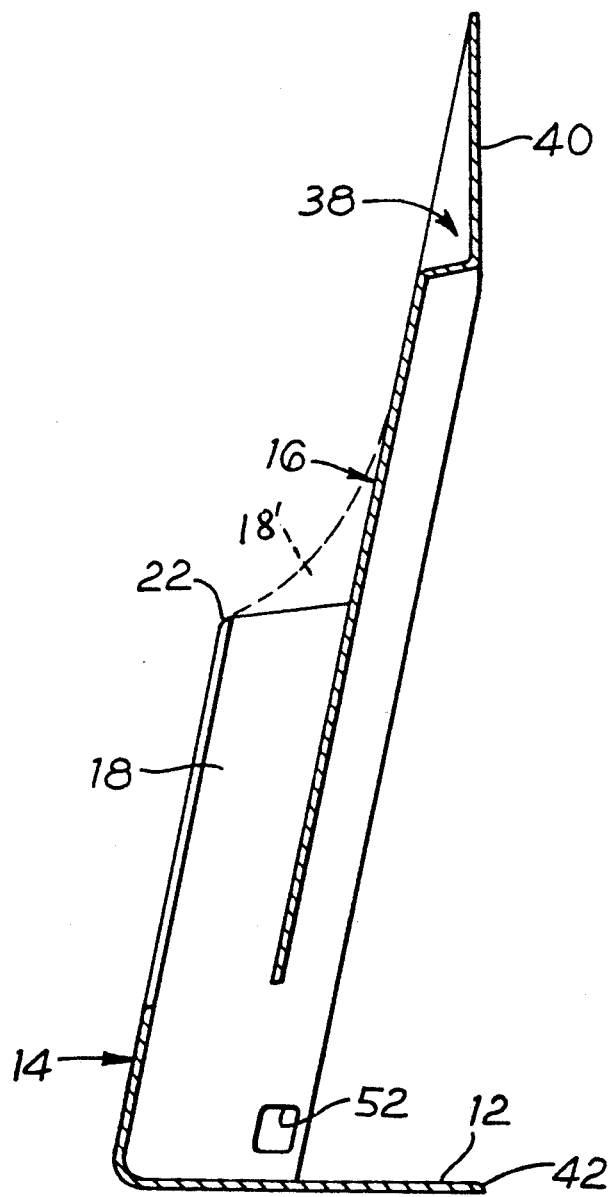
FIG. 3 is a view in section on the line III—III of FIG. 2.

The illustrative receptacle 10 may be suspended from a suitable support, for example by means of screws in a wall surface positioned at an appropriate spacing for the heads of the screws to be passed through the larger part of the keyhole slots 44 and the screw (not shown) to be slidingly received in the narrow parts of the slots 44 to suspend the receptacle. In this condition, the flat portion 40 of the recess abuts the surface from which the screws project and the rear edge 42 of the bottom 12 of the receptacle rests against the flat surface thereby supporting the receptacle in an orientation generally similar to that in which it is shown in FIG. 3. Any suitable type of means may be used to suspend the receptacle, for example hooks carried in a display board or the like. Alternatively, the receptacle 10 may be placed on a flat surface resting on the bottom 12.

The illustrative receptacle comprises a connecting member namely a hook 46 projecting outwardly from one of the side walls 18. The hook comprises a first portion 48 projecting at right angles from the wall 18 parallel with the bottom 12 of the receptacle and a hooked end portion 50 parallel with the side wall 18 and perpendicular to the bottom 12 of the receptacle. An opening 52 is positioned in the opposite side wall 18 at a position corresponding to that of the hook 46. The hook 46 of a receptacle may be inserted in the opening 52 of a similar receptacle placed adjacent the first receptacle so that the hook engages the side wall 18 of the second receptacle thus to connect the two receptacles together.

If desired, an embossed portion 62 may be formed on the front wall 14 and/or the rear wall 16. The embossed portion may be decorative or may provide information, for example as to the supplier of the receptacle or the contents of the receptacle.

Figure 2:
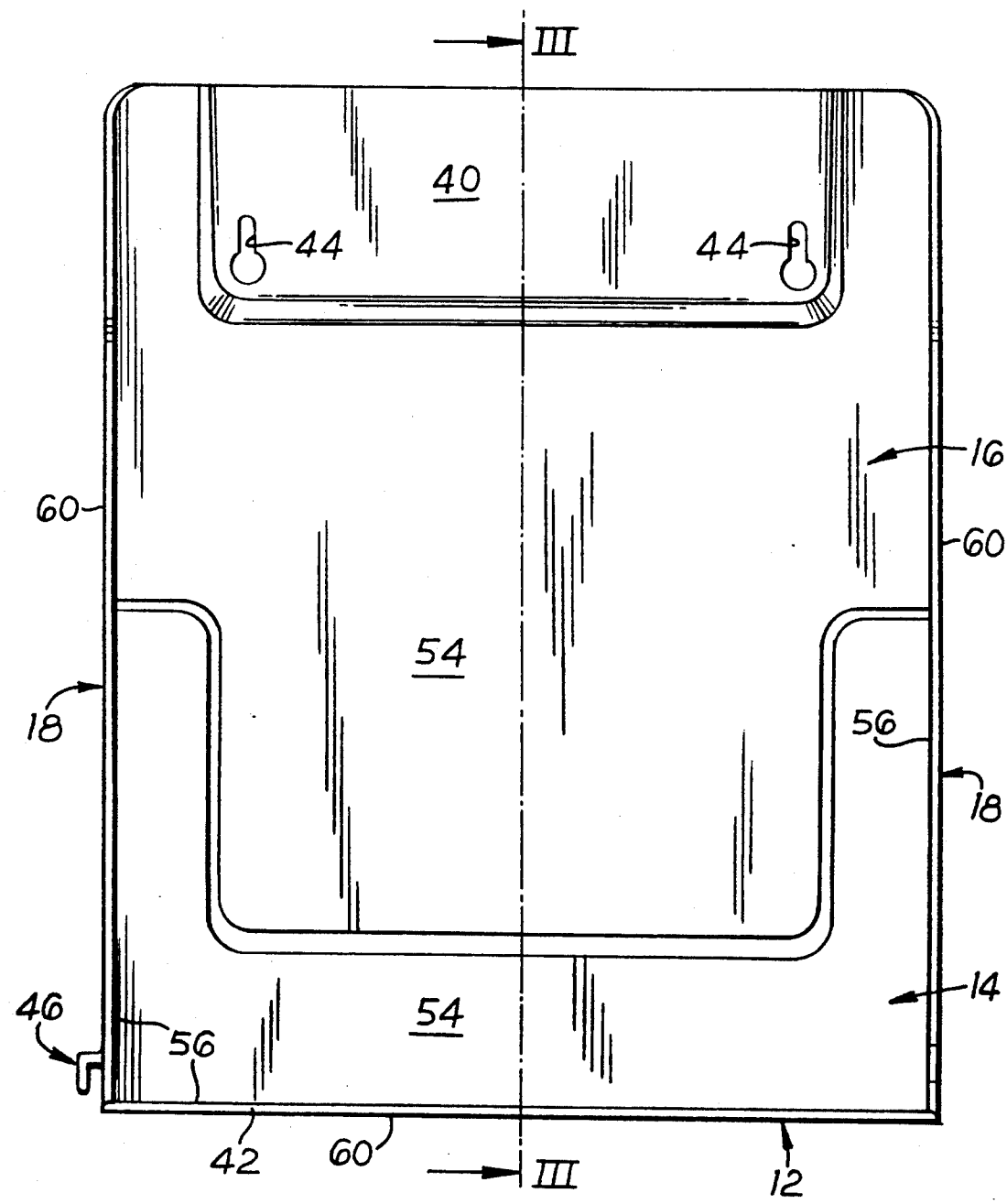
FIG. 2 is a view in rear elevation of the receptacle.

The illustrative receptacle 10 is made by injection moulding a suitable rigid plastics material, for example polymethylmethacrylate using well known injection moulding techniques. In order to produce the receptacle, an injection mould of novel construction, itself an embodiment of the invention in one of its aspects must be used. The illustrative injection mould (not shown) is a so-called split mould comprising two mould parts which meet at a parting line to define a cloned mould cavity. A first of the mould parts has moulding races which provide parts of the mould cavity defining rear surfaces 54 of the front and rear walls 14, 16 of the receptacle 10 and inner surfaces 56 of the side walls 18 and bottom 12 of the receptacle (see FIG. 2). The second mould part has moulding faces which provide parts of the mould cavity defining front surfaces 58 of the front and rear walls 14, 16 and outer surfaces 60 of the side walls 18 and bottom 12 of the receptacle. The mould cavity has further moulding surfaces which define the hook 46. Because of the configuration of the front and rear walls 14, 16 of the receptacle, it is possible for a split mould to provide a mould cavity of suitable shape. As the cavity is designed so that the front and rear walls 14, 16 and side walls 18 have parallel surfaces it is possible for the two mould parts to be moved rectilinearly apart in a direction parallel with the plane of the bottom 12 and the planes of the side walls 18 so that the moulded receptacle can be separated from the mould. The opening 52 may be cut from the side wall or formed using a moving core. If a moving core portion is used, this is relatively simple and only a small movement is necessary to withdraw the core so that moulding cycles can be more rapid than those using the moving core mould to form the whole receptacle. Furthermore, the illustrative injection mould is much cheaper to manufacture than the moving core mould heretofore used.

Whilst, in the illustrative receptacle, the side walls 18 are parallel, a similar receptacle may be made using a similar technique where the side walls diverge from front to rear of the receptacle; furthermore, the front and rear walls need not necessarily be flat, provided that there are no re-entrant portions which would interlock with portions of the mould preventing opening of the cavity or removal of the moulded receptacle from the mould.

A removable insert may, if desired, be provided in one, or both, of the mould parts. Such an insert may be provided with an embossed pattern providing an embossed moulding face of a portion of the mould by which the front or rear walls, 14, 16 of the receptacle is to be moulded. The embossed portion may merely be intended to provide a decorative pattern on the receptacle, or may include words intended to identify the manufacturer or supplier of the receptacle or to identify the contents of the receptacle. A suitable embossed portion 62 is indicated in FIG. 1 on the front face 58 of the central portion 28 of the front wall 40. By using a removable insert, it is possible to exchange the insert for one carrying different wording or a different pattern whilst keeping the remainder of the mould, thereby readily producing customised receptacles. Because embossed portions are formed on the front and rear walls 14, 16, and the mould parts separate by moving directly away from front and rear walls 14, 16 (rather than parallel to these walls as in the removing core mould) a pronounced embossed effect can readily be produced.

As indicated by broken lines in FIGS. 1 and 3, reinforcing fillets 18' may be provided on the upper edges of the side walls 18.

The embodiments of the invention in which an exclusive property or privilege is claimed are defined as follows:

1. An injection moulded receptacle which is open at the top comprising a bottom, a front wall, a rear wall spaced from the front wall, said rear wall having a lowermost edge spaced from the bottom, and two side walls connecting the front and rear walls at either side of the receptacle, both side walls, or the front wall and both side walls, being connected to the bottom, an upper edge of the front wall being spaced from the bottom by less than the distance of the lowermost edge of the rear wall from the bottom, the rear wall being connected to the side walls only at positions spaced from the bottom a greater distance than the upper edges of the front wall adjacent the side walls.

2. A receptacle according to claim 1 wherein the front wall comprises two side regions each connected to an adjacent side wall and having an uppermost edge and a central region between the side regions having an upper edge spaced from the bottom by a distance less than the height of said uppermost edges, and wherein the rear wall has side regions connected to the side walls above said uppermost edges and a central region corresponding with the central region of the front wall projecting downwardly below the side regions of the rear wall and spaced from the bottom by a distance the same as or less than the distance by which the upper edge of the central region of the front wall is spaced from the bottom.

3. A receptacle according to claim 1 wherein the side walls are flat and parallel, and the front and rear walls are flat, parallel and perpendicular to the side walls.

4. A receptacle according to claim 1, wherein the front and rear walls are inclined rearwardly from the bottom upwards.

5. A receptacle according to claim 1 and further comprising means in an upper portion of the rear wall by which the receptacle may be attached to a support.

6. A receptacle according to claim 1 and further comprising a connecting member projecting outwardly from one of the side walls and a correspondingly positioned opening in the opposite side wall, the construction and arrangement being such that the connecting member can be inserted into the opening of an adjacent similar receptacle thus to engage the adjacent receptacle and connect the receptacles together.

7. A receptacle according to claim 1 and further comprising an embossed portion on the front and/or rear walls.

* * * * *